W. BEERS.

Wagon Tongue.

4490 REISSUED AUG 1 1871

Witnesses
J. H. Burridge.
D. L. Humphrey.

Inventor.
Tom Burs
per Burridge & Co

AML PHOTO-LITHOGRAPHIC CO. N.Y. (OSBORNE'S PROCESS.)

UNITED STATES PATENT OFFICE.

WILLIAM BEERS, OF MILAN, OHIO.

IMPROVEMENT IN WAGON-TONGUE SUPPORTS.

Specification forming part of Letters Patent No. 115,016, dated May 23, 1871; reissue No. 4,490, dated August 1, 1871.

*To all whom it may concern:*

Be it known that I, WILLIAM BEERS, of Milan, in the county of Erie and State of Ohio, have invented certain new and useful Improvements in Wagon-Tongue, of which the following is a description, reference being had to the accompanying drawing making a part of this specification.

Figure 1:
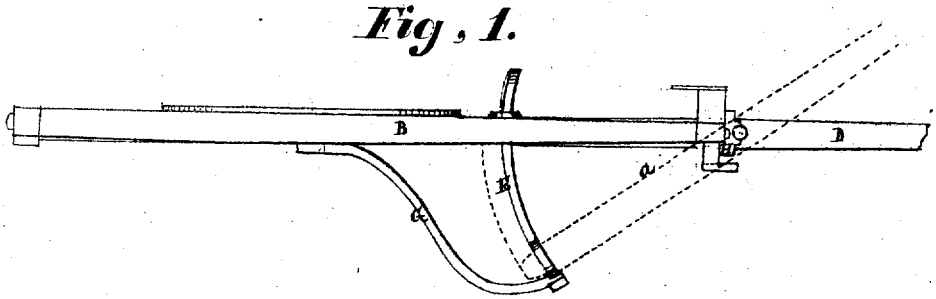
Figure 2:
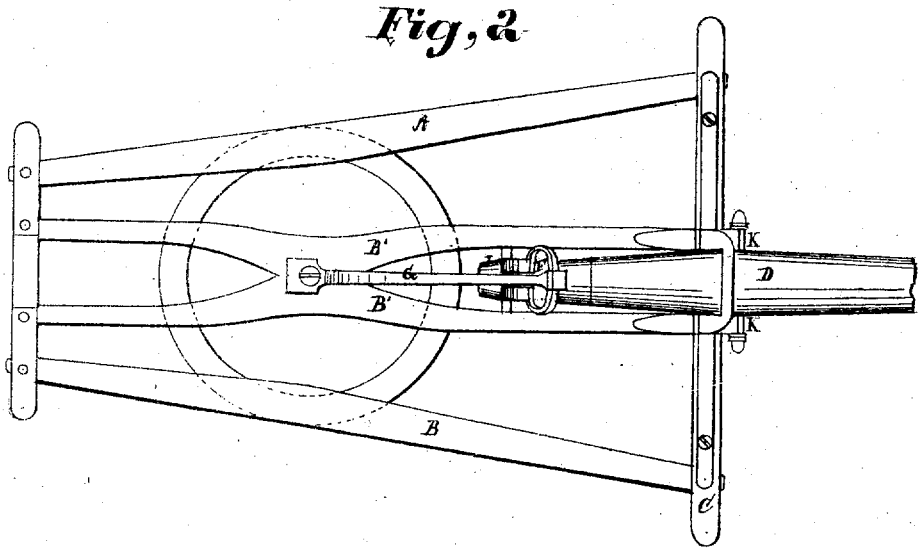
Figure 3:
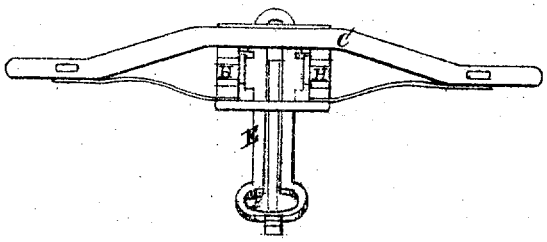
Figure 4:
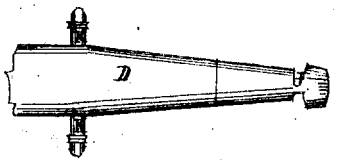

Figure 1 is a view of the tongue. Fig. 2 is an under side view. Fig. 3 is an end view. Fig. 4 is a detached section.

Like letters of reference refer to like parts in the several views.

The nature of this invention relates to the manner of attaching the tongue or pole of a wagon to the hounds; and the object of the same is to dispense with the use of bolts for that purpose, so that said tongue can be easily and readily detached from the wagon or attached thereto, as the case may be, of which the following is a more full and complete description:

In the drawing, Fig. 2, A B represent the hounds of the wagon, and C the cross-tree, to which the tongue D is attached, as follows: Between the cheeks of the central pieces B′ is secured one end of a slotted segment, E, Fig. 3, the lower end of which terminates in an oblong eye, F, to which the stay G is attached for bracing the same. To the front end of each of the pieces B is secured a journal-seat, H, the purpose of which will presently be shown. The inner end of the tongue or pole D referred to is provided with a head, I, attached thereto by means of a neck, J, Fig. 4. The tongue is also provided with a pair of lugs or trunnions, K. Said lugs are of a size to fit closely but not tightly in the journal-seats H on the end of the pieces B above described.

The practical application of the tongue to the wagon is as follows: The end of the tongue, having thereon the head I, is inserted in the opening or space L between the front ends of the pieces B, in the position indicated by the dotted lines *a*, Fig. 1. This will bring the head I to the oblong eye F of the segment, through which it passes, thereby bringing the neck J into the slot of the segment and the lugs or trunnions *k* into the journal-seats, as shown in Figs. 1 and 2. The pole thus inserted and brought to the horizontal position, as shown in Fig. 1, cannot pull out, in consequence of the head I being on the outside of the segment, whereas it is free to move along in either direction of the segment by the neck J moving in the slot. The tongue is supported by the lugs, which serve as a pivotal center and bearings for the vertical movement of the tongue.

It will be obvious that a pole attached in this way to the hounds of a wagon can be easily detached therefrom by simply bringing the pole to the position indicated by the dotted lines *a*, which will admit of the pole being drawn out from the segment and hounds. It is often a matter of great convenience to be enabled thus to remove the pole of the wagon, as the pole, when removed, can be laid under the wagon or placed out of the way in some unused corner, so that the wagon, having the pole removed, will take up much less room in the coach-house or other place.

What I claim as my invention, and desire to secure by Letters Patent, is—

1. The slotted segment E, as arranged in relation to and in combination with the tongue D, substantially in the manner as described and for the purpose set forth.

2. The tongue D, when constructed with lugs K, head I, and neck J, and arranged in combination with the segment G and journal-seats H, in the manner as and for the purpose specified.

WILLIAM BEERS.

Witnesses:

JAMES BLACK,

RANSOM ROSCOE.